United States Patent
DeFelice et al.

(10) Patent No.: US 12,276,291 B2
(45) Date of Patent: Apr. 15, 2025

(54) VALVE BORE WASH FILTERS

(71) Applicant: Hamilton Sundstrand Corporation, Charlotte, NC (US)

(72) Inventors: Robert DeFelice, South Windsor, CT (US); Frank N. Perillo, Cromwell, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 142 days.

(21) Appl. No.: 17/988,351

(22) Filed: Nov. 16, 2022

(65) Prior Publication Data

US 2024/0159257 A1 May 16, 2024

(51) Int. Cl.
*F16K 31/12* (2006.01)
*F15B 21/041* (2019.01)

(52) U.S. Cl.
CPC ............ *F15B 21/041* (2013.01); *F16K 31/12* (2013.01)

(58) Field of Classification Search
CPC ............ B01D 46/2403; B01D 46/4272; B01D 46/005; B01D 39/10
See application file for complete search history.

(56) References Cited

U.S. PATENT DOCUMENTS

| | | | | |
|---|---|---|---|---|
| 5,431,706 A * | 7/1995 | Paas | ...................... | B01D 46/60 55/528 |
| 7,153,346 B2 | 12/2006 | Ball et al. | | |
| 7,284,569 B2 * | 10/2007 | Takemaru | .......... | B01D 46/2403 137/625.3 |
| 7,837,753 B2 | 11/2010 | Roundy et al. | | |
| 7,927,396 B2 * | 4/2011 | Olson | ................ | B01D 46/4272 55/420 |
| 8,216,329 B2 * | 7/2012 | McAuliffe | ......... | B01D 46/0005 251/30.01 |
| 8,672,350 B2 * | 3/2014 | Hatomoto | .............. | B01D 39/12 280/736 |
| 9,789,430 B2 * | 10/2017 | Jackson | ................. | B01D 46/64 |
| 10,040,015 B2 * | 8/2018 | Dworatzek | ........ | B01D 46/0001 |
| 10,058,803 B2 * | 8/2018 | Li | .......................... | B01D 29/54 |

(Continued)

FOREIGN PATENT DOCUMENTS

| | | |
|---|---|---|
| CN | 106853302 A | 6/2017 |
| CN | 210239937 U | 4/2020 |

(Continued)

OTHER PUBLICATIONS

Translation of CN 114949992-A (Year: 2022).*
Extended European Search Report for EP Application No. 23210036. 2, Dated Apr. 2, 2024, pp. 7.

*Primary Examiner* — Umashankar Venkatesan
(74) *Attorney, Agent, or Firm* — Kinney & Lange, P. A.

(57) ABSTRACT

A filter includes a first edge structure forming a first ring about an axis. A second edge structure forms a second ring about the axis, axially spaced apart from the first ring along the axis. A filter medium extends from the first edge structure to the second edge structure. The first and second edge structures are configured to engage an internal surface of a main bore of a valve housing. The filter medium is configured to allow air flow through the filter medium from the main bore radially outward through the filter medium to filter particulate out of an airflow from the main bore passing radially outward through the filter medium.

20 Claims, 3 Drawing Sheets

(56) References Cited

U.S. PATENT DOCUMENTS

| | | | |
|---|---|---|---|
| 10,099,161 B2 | 10/2018 | Dehais et al. | |
| 10,221,736 B2 * | 3/2019 | Zuerker | F01M 13/0011 |
| 10,786,775 B2 * | 9/2020 | Oberli | B01D 46/0045 |
| 10,918,986 B2 * | 2/2021 | Tanaka | B01D 46/0031 |
| 11,492,931 B2 * | 11/2022 | Breindl | B01D 46/103 |
| 2002/0108654 A1 | 8/2002 | Vreeland et al. | |
| 2006/0021933 A1 | 2/2006 | Radcliffe | |
| 2018/0085701 A1 * | 3/2018 | Chellappan | B01D 46/2403 |
| 2021/0291093 A1 * | 9/2021 | Oler | B01D 29/05 |
| 2024/0042350 A1 * | 2/2024 | Banju | B01D 39/10 |
| 2024/0353048 A1 * | 10/2024 | Yanagida | F16L 55/24 |

FOREIGN PATENT DOCUMENTS

| | | | | |
|---|---|---|---|---|
| CN | 114949992 A * | 8/2022 | | B01D 29/11 |
| DE | 102018100532 A1 | 7/2019 | | |

* cited by examiner

VALVE BORE WASH FILTERS

BACKGROUND

1. Field

The present disclosure relates to pneumatics, and more particularly to filters such as for pneumatic valve control and the like.

2. Description of Related Art

A pneumatic valve often contains control elements such as torque motors, solenoids, and orifices that are sensitive to small contaminants. As such, the air passed to these control features must be filtered to prolong the life of the valve. Filters have historically been of a cartridge variety that can be inserted into the valve or actuator housing. This results in added material for the valve to contain the filter, adding weight to the part. Additionally, these traditional filters require routine service to ensure they do not become fully clogged with contaminants, impacting performance, reliability, and cost to the customer/user.

The conventional techniques have been considered satisfactory for their intended purpose. However, there is an ever present need for improved systems and methods for filtering in pneumatic systems. This disclosure provides a solution for this need.

SUMMARY

A filter includes a first edge structure forming a first ring about an axis. A second edge structure forms a second ring about the axis, axially spaced apart from the first ring along the axis. A filter medium extends from the first edge structure to the second edge structure. The first and second edge structures are configured to engage an internal surface of a main bore of a valve housing. The filter medium is configured to allow air flow through the filter medium from the main bore radially outward through the filter medium to filter particulate out of an airflow from the main bore passing radially outward through the filter medium.

The first ring, the second ring, and the filter medium can be of aluminum, stainless steel, and/or an austenitic nickel-chromium-based superalloy. The filter medium can include a plurality of holes therethrough that are configured to allow air to pass through the filter medium in a radially outward direction, and to wash particles off of an inner surface of the filter medium with an axial flow of air. The plurality of holes can include a plurality of laser cut holes through the filter medium configured to pass air through the filter medium but to block passage of particles. Each of the holes in the plurality of holes can be between 5 and 100 microns in diameter, inclusive of 5 and 100 microns. The first ring can be comprised of a rolled first edge of the filter medium, and the second ring can be comprised of a rolled second edge of the filter medium. The first ring, the second ring, and the filter medium can be resilient for temporary elastic deformation of the first ring, the second ring, and the filter medium radially inward for seating in a main bore of a valve housing.

A pneumatic valve assembly includes a housing defining a main internal bore therethrough extending from an inlet of the housing to an outlet of the housing. A valve member is configured to move within the main bore between a first position for restricting flow through the main bore and a second position for increasing flow area through the main bore relative to the first position. A filter channel extends circumferentially around an interior surface of the main bore, wherein the filter channel defines a filter seat. A filter as described above is seated in the filter seat. A radial bore extends from a position in the filter channel to a pneumatic actuator operatively connected to the valve member for moving the valve member between the first position and the second position, wherein the filter medium is positioned to filter particulates out of an airflow from the main bore into the pneumatic actuator through the radial bore.

The filter channel can include a main channel extending fully around the main bore in a circumferential direction. The radial bore can open into a bottom surface of the main channel. A first land can be at a first axial end of the main channel, wherein the first land extends radially inward relative to the bottom surface of the main channel for engaging with the first edge structure of the filter. A second land can be at a second axial end of the main channel opposite the first land, wherein the second land extends radially inward relative to the bottom surface of the main channel for engaging with the second edge structure of the filter. The filter medium can be suspended radially inward from the bottom surface of the main channel.

The main channel can have in a width in an axial direction from the first land to the second land, and a height in a radial direction from the bottom surface of the main channel to the first and second lands. The width of the main channel can be several times greater than the height of the main channel.

The filter channel can include a first roll channel on an axially opposite side of the first land from the main channel. The first edge structure of the filter can be rolled radially outward into the first roll channel. A second roll channel can be included on an axially opposite side of the second land from the main channel. The second edge structure of the filter can be rolled radially outward into the second roll channel. The pneumatic actuator can include at least one of a solenoid and/or a torque motor configured to rotate the valve member about a rotation axis transverse to the axis of the main bore.

A method includes filtering particulates from an air flow through a main bore of a valve with a filter medium in the main bore to supply a filtered flow of air to a pneumatic actuator in fluid communication with the main bore. The method can include cleaning particulates from the filter medium with a main flow of air flowing through the main bore. The method can include moving a valve member in the main bore to adjust flow through the main bore, wherein the pneumatic actuator moves the valve member.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
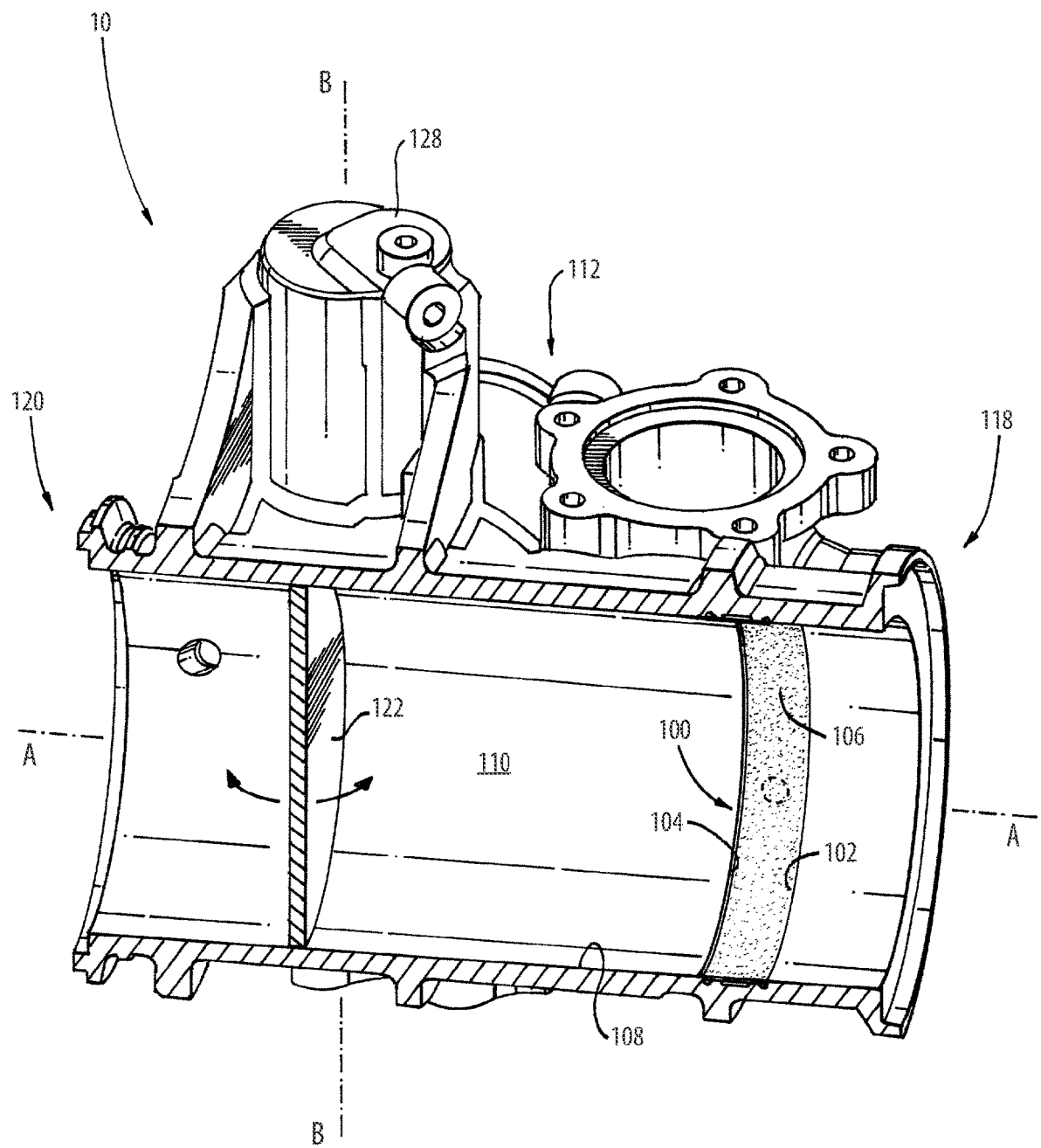
FIG. 1 is a schematic cross-sectional perspective view of an embodiment of a valve assembly constructed in accordance with the present disclosure, showing the filter in the main bore of the valve housing.

Reference will now be made to the drawings wherein like reference numerals identify similar structural features or aspects of the subject disclosure. For purposes of explanation and illustration, and not limitation, a partial view of an embodiment of a filter in accordance with the disclosure is shown in FIG. 1 and is designated generally by reference character 100. Other embodiments of systems in accordance with the disclosure, or aspects thereof, are provided in FIGS. 2-3, as will be described. The systems and methods described herein can be used to provide self-cleaning filters such as for use in pneumatic actuated valves and the like.

Figure 2:
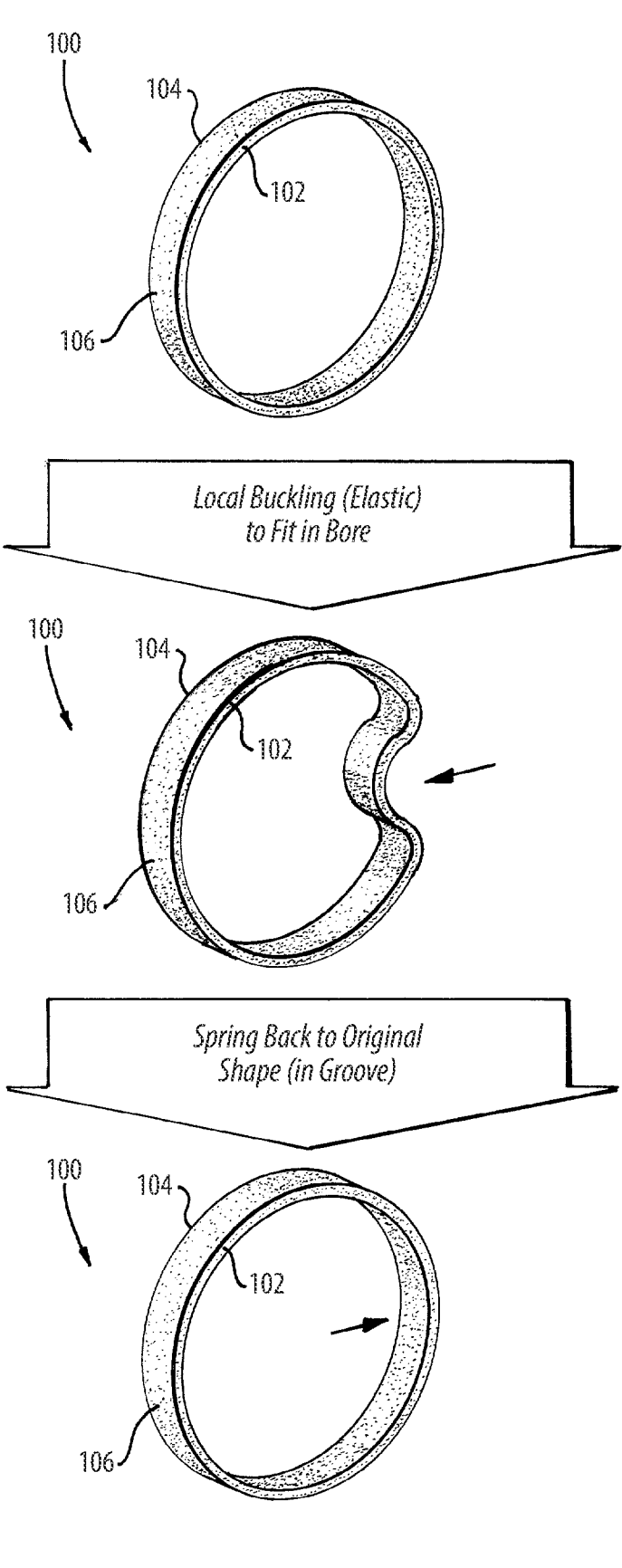
FIG. 2 is a schematic view of the filter of FIG. 1, showing the elastic deformation of the filter to seat the filter in the main bore of FIG. 1.

The filter 100 includes a first edge structure 102 forming a first ring about an axis A. A second edge structure 104 forms a second ring about the axis A, axially spaced apart from the first ring along the axis A. A filter medium 106 extends from the first edge structure 102 to the second edge structure 104. The first and second edge structures 102, 104 are configured to engage an internal surface 108 of a main bore 110 of a valve housing 112. As indicated in FIG. 2, The first edge structure 102, the second edge structure 104, and the filter medium 106 together form a hoop or ring and are resilient for temporary elastic deformation, e.g. buckling, of the hoop radially inward, as indicated in the middle hoop of FIG. 2, for seating in a main bore 110 of a valve housing 112 shown in FIG. 1.

Figure 3:
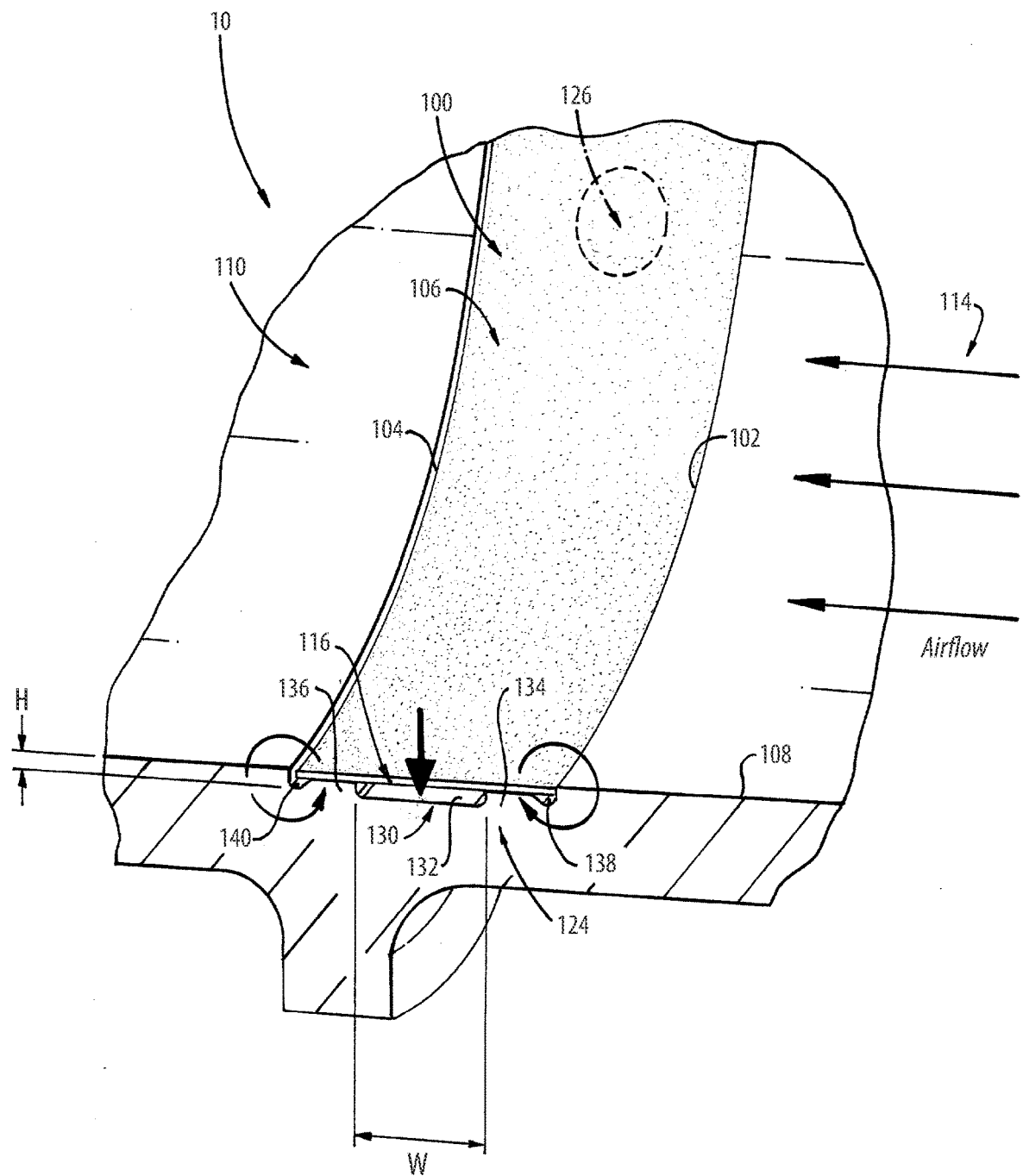
FIG. 3 is a schematic cross-sectional perspective view of a portion of the assembly of FIG. 1, showing the filter medium suspended over the main channel.

With reference now to FIG. 3, the filter medium 106 is configured to allow air flow through the filter medium 106 from the main bore 110 radially outward through the filter medium 106, as indicated by the heavy arrow in FIG. 3, to filter particulate out of an airflow 114 from the main bore 110 passing radially outward through the filter medium 106. The first edge structure 102, the second edge structure 104, and the filter medium 106 can be formed of aluminum, stainless steel, and/or an austenitic nickel-chromium-based superalloy such as Inconel® alloys from Specialty Metals of New Hartford, New York. The filter medium 106 can include a plurality of laser cut holes, e.g. thousands of laser cut holes, therethrough configured to pass air through the filter medium 106 but to block passage of particles. The laser cut holes are configured to allow air to pass through the filter medium in a radially outward direction indicated by the heavy arrow in FIG. 3, and to wash particles off of an inner surface 116 of the filter medium 106 with an axial flow of air, i.e. the airflow 114 indicated in FIG. 3. The laser cut holes can be between 5 and 100 microns in diameter, inclusive of 5 and 100 microns. The first and second edge structures 102, 104 can be a simple edges, where the filter 100 is a sheet formed about the curved surface of a cylinder. However, it is also contemplated that the first and second edge structures 102, 104 can each include a rolled edge of the filter medium 106, rolled in the directions indicated by the rounded arrows in FIG. 3. Rolling the edge structures 102, 104 can lend extra rigidity to the filter 100, and can increase engagement with the bore 110, as described below.

With reference again to FIG. 1, a pneumatic valve assembly 10 includes the housing 112 defining the main internal bore 110 therethrough extending from an inlet 118 of the housing 112 to an outlet 120 of the housing 112. A valve member 122 is configured to move within the main bore 110 between a first position for restricting flow through the main bore 110 and a second position for increasing flow area through the main bore 110 relative to the first position. The first and second positions can be two different positions of rotation about the valve member axis B, which is transverse to the axis A of the main bore 110, as indicated by the double headed arrow in FIG. 1.

With reference again to FIG. 3, a filter channel 124 extends circumferentially around the interior surface 108 of the main bore 110, wherein the filter channel 124 defines a seat for the filter 100. A filter 100 as described above can be seated in the filter seat of the channel 124 by radially deforming a portion of the filter 100, as shown in FIG. 2, to facilitate insertion of the filter 100 into the main bore 110, followed by allowing the filter 100 to resiliently restore to its original shape after positioning it in the filter seat of the filter channel 124. A radial bore 126 extends from a position in the filter channel 124 to a pneumatic actuator 128, shown in FIG. 1, operatively connected to the valve member 122, shown in FIG. 1, for moving the valve member 110 between the first position and the second position, or anywhere between those two positions in the case of a modulating valve. The pneumatic actuator 128 includes any suitable type of actuator such as a solenoid, a torque motor, electromechanical interface devices (EMIDs) or the like. The filter medium is positioned to filter particulates out of the airflow from the main bore 110 into the pneumatic actuator 168, shown in FIG. 1, through the radial bore 126.

With continued reference to FIG. 3, the filter channel 124 includes a main channel 130 extending fully around the main bore 110 in a circumferential direction relative to the axis A. The radial bore 126 opens into a bottom surface 132 of the main channel 130. A first land 134 is at a first axial end of the main channel 130, wherein the first land 134 extends radially inward relative to the bottom surface 132 of the main channel 130. The first land 134 engages with the first edge structure 102 of the filter 100. A second land 136 is at a second axial end of the main channel 130 opposite the first land 134, wherein the second land 136 extends radially inward relative to the bottom surface 132 of the main channel 130 for engaging with the second edge structure 104 of the filter 100. The lands 134, 136 suspend the filter medium 106 radially inward from the bottom surface 132 of the main channel 130.

The main channel 130 has a width W in an axial direction from the first land 134 to the second land 136, and a height H in a radial direction from the bottom surface 132 of the main channel 130 to the first and second lands 134, 136. The width W of the main channel 130 is several times greater than the height H of the main channel 130, giving the main channel 130 a high aspect ratio in the axial and circumferential directions. The low flow velocity through the filter medium 106 is produced by the relationship of all flow areas relative to that of the limiting restriction, e.g. radial bore 126 or a smaller restriction downstream of it. As long as the upstream flow passages, e.g. main internal bore 110 and the main channel 130, are each several times the flow area (e.g. 5-10 times) that of the limiting restriction, the velocity of air moving through the larger passageways will be significantly below the speed of sound. The lower velocity reduces contamination of the filter medium 106 because the momentum of the air is unable to provide the flow force needed to carry larger particles. This provides a low flow velocity for air passing through the filter medium 106, which lowers the chances of particles passing through the filter medium 106 from the main bore 110.

The filter channel 124 includes a first roll channel 138 on an axially opposite side of the first land 134 from the main channel 130. The first edge structure 102 of the filter 100 can be rolled radially outward, as described above, to engage into the first roll channel 138. A second roll channel 140 can be included on an axially opposite side of the second land 136 from the main channel 130. The second edge structure 104 of the filter 100 can be rolled radially outward to engage into the second roll channel 140.

A method includes filtering particulates from an air flow, e.g. air flow 114, through a main bore, e.g. bore 110, of a valve with a filter medium, e.g. filter medium 106, to supply a filtered flow of air to a pneumatic actuator in fluid communication with the main bore, e.g. through a radial bore 126. The method can include cleaning particulates from the filter medium, e.g. by washing particles away from the filter medium with the main flow, e.g. flow 114, of air flowing through the main bore. The method can include moving a valve member, e.g. valve member 122 of FIG. 1, in the main bore to adjust flow through the main bore, wherein the pneumatic actuator moves the valve member.

Potential benefits of the systems and methods disclosed herein include the following. A wash style filter in the valve bore can be self-cleaning because the momentum of air flowing through the valve would remove debris that has built up when the valve is closed. By having filtered flow capability around the entire bore of the valve, the average velocity going through the holes can be much lower than with traditional J-tube or scarf-cut tubes. This lower air velocity can be less capable of carrying heavy contaminants, increasing the capability of the filter. The result can be a longer filter life that requires no servicing. Additionally, there can be a significant potential for substantial weight, size, and cost savings by eliminating cartridge style filters.

The methods and systems of the present disclosure, as described above and shown in the drawings, provide for self-cleaning filters such as for use in pneumatic actuated valves and the like. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A filter comprising:
a first edge structure forming a first ring about an axis;
a second edge structure forming a second ring about the axis, axially spaced apart from the first ring along the axis; and
a filter medium extending from the first edge structure to the second edge structure, wherein the first and second edge structures are configured to engage an internal surface of a main bore of a valve housing, and wherein the filter medium is configured to allow air flow through the filter medium from the main bore radially outward through the filter medium to filter particulate out of an airflow from the main bore passing radially outward through the filter medium;
wherein the first ring, the second ring, and the filter medium are of aluminum, stainless steel, and/or an austenitic nickel-chromium-based superalloy.

2. The filter as recited in claim 1, wherein the first ring is comprised of a rolled first edge of the filter medium, and wherein the second ring is comprised of a rolled second edge of the filter medium.

3. A pneumatic valve assembly comprising:
a housing defining a main internal bore therethrough extending from an inlet of the housing to an outlet of the housing;
a valve member configured to move within the main bore between a first position for restricting flow through the main bore and a second position for increasing flow area through the main bore relative to the first position;
a filter channel extending circumferentially around an interior surface of the main bore, wherein the filter channel defines a filter seat;
a filter as recited in claim 2 seated in the filter seat; and
a radial bore extending from a position in the filter channel to a pneumatic actuator operatively connected to the valve member for moving the valve member between the first position and the second position, wherein the filter medium is positioned to filter particulates out of an airflow from the main bore into the pneumatic actuator through the radial bore.

4. The pneumatic valve assembly as recited in claim 3, wherein the filter channel includes:
a main channel extending fully around the main bore in a circumferential direction, wherein the radial bore opens into a bottom surface of the main channel;
a first land at a first axial end of the main channel, wherein the first land extends radially inward relative to the bottom surface of the main channel for engaging with the first edge structure of the filter; and
a second land at a second axial end of the main channel opposite the first land, wherein the second land extends radially inward relative to the bottom surface of the main channel for engaging with the second edge structure of the filter, wherein the filter medium is suspended radially inward from the bottom surface of the main channel.

5. The pneumatic valve assembly as recited in claim 4, wherein the main channel has a width in an axial direction from the first land to the second land, and a height in a radial direction from the bottom surface of the main channel to the first and second lands, wherein the width of the main channel is several times greater than the height of the main channel.

6. The pneumatic valve assembly as recited in claim 4, wherein the filter channel includes:
a first roll channel on an axially opposite side of the first land from the main channel, wherein the first edge structure of the filter is rolled radially outward into the first roll channel; and
a second roll channel on an axially opposite side of the second land from the main channel, wherein the second edge structure of the filter is rolled radially outward into the second roll channel.

7. A filter comprising:
a first edge structure forming a first ring about an axis;
a second edge structure forming a second ring about the axis, axially spaced apart from the first ring along the axis; and
a filter medium extending from the first edge structure to the second edge structure, wherein the first and second edge structures are configured to engage an internal surface of a main bore of a valve housing, and wherein the filter medium is configured to allow air flow through the filter medium from the main bore radially outward through the filter medium to filter particulate out of an airflow from the main bore passing radially outward through the filter medium;
wherein the filter medium includes a plurality of holes therethrough that are configured to allow air to pass through the filter medium in a radially outward direction, and to wash particles off of an inner surface of the filter medium with an axial flow of air.

8. The filter as recited in claim 7, wherein the first ring, the second ring, and the filter medium are of aluminum, stainless steel, and/or an austenitic nickel-chromium-based superalloy.

9. The filter as recited in claim 7, wherein the plurality of holes includes a plurality of laser cut holes through the filter medium configured to pass air through the filter medium but to block passage of particles.

10. The filter as recited in claim 7, wherein each of the holes in the plurality of holes are between 5 and 100 microns in diameter, inclusive of 5 and 100 microns.

11. The filter as recited in claim 7, wherein the first ring is comprised of a rolled first edge of the filter medium, and wherein the second ring is comprised of a rolled second edge of the filter medium.

12. The filter as recited in claim 7, wherein the first ring, the second ring, and the filter medium are resilient for temporary elastic deformation of the first ring, the second ring, and the filter medium radially inward for seating in a main bore of a valve housing.

13. A pneumatic valve assembly comprising:
a housing defining a main internal bore therethrough extending from an inlet of the housing to an outlet of the housing;
a valve member configured to move within the main bore between a first position for restricting flow through the main bore and a second position for increasing flow area through the main bore relative to the first position;
a filter channel extending circumferentially around an interior surface of the main bore, wherein the filter channel defines a filter seat;
a filter as recited in claim 1 seated in the filter seat; and
a radial bore extending from a position in the filter channel to a pneumatic actuator operatively connected to the valve member for moving the valve member between the first position and the second position, wherein the filter medium is positioned to filter particulates out of an airflow from the main bore into the pneumatic actuator through the radial bore.

14. The pneumatic valve assembly as recited in claim 13, wherein the filter channel includes:
a main channel extending fully around the main bore in a circumferential direction, wherein the radial bore opens into a bottom surface of the main channel;
a first land at a first axial end of the main channel, wherein the first land extends radially inward relative to the bottom surface of the main channel for engaging with the first edge structure of the filter; and
a second land at a second axial end of the main channel opposite the first land, wherein the second land extends radially inward relative to the bottom surface of the main channel for engaging with the second edge structure of the filter, wherein the filter medium is suspended radially inward from the bottom surface of the main channel.

15. The pneumatic valve assembly as recited in claim 14, wherein the main channel has a width in an axial direction from the first land to the second land, and a height in a radial direction from the bottom surface of the main channel to the first and second lands, wherein the width of the main channel is several times greater than the height of the main channel.

16. The pneumatic valve assembly as recited in claim 14, wherein the filter channel includes:
a first roll channel on an axially opposite side of the first land from the main channel, wherein the first edge structure of the filter is rolled radially outward into the first roll channel; and
a second roll channel on an axially opposite side of the second land from the main channel, wherein the second edge structure of the filter is rolled radially outward into the second roll channel.

17. The pneumatic valve assembly as recited in claim 13, wherein the pneumatic actuator includes at least one of a solenoid and/or a torque motor configured to rotate the valve member about a rotation axis transverse to the axis of the main bore.

18. A method of supplying a filtered flow of air to the pneumatic actuator of the pneumatic valve assembly of claim 13, the method comprising:
filtering particulates from an air flow through the main internal bore of pneumatic valve assembly with the filter medium in the main internal bore to supply a filtered flow of air to the pneumatic actuator in fluid communication with the main internal bore.

19. The method as recited in claim 18, further comprising cleaning particulates from the filter medium with the air flow flowing through the main internal bore.

20. The method as recited in claim 18, further comprising moving the valve member in the main bore to adjust flow through the main internal bore, wherein the pneumatic actuator moves the valve member.

* * * * *